(12) United States Patent
Le Roy et al.

(10) Patent No.: US 10,017,171 B2
(45) Date of Patent: Jul. 10, 2018

(54) METHOD FOR REDUCING THE ENERGY OF THE ACCELERATION-BOOSTING TORQUE OF A HYBRID VEHICLE

(71) Applicant: RENAULT s.a.s., Boulogne-Billancourt (FR)

(72) Inventors: Loic Le Roy, Le Plessis Robinson (FR); Jean-Martin Ruel, Paris (FR)

(73) Assignee: RENAULT s.a.s., Boulogne-Billancourt (FR)

(*) Notice: Subject to any disclaimer, the term of this patent is extended or adjusted under 35 U.S.C. 154(b) by 0 days.

(21) Appl. No.: 14/759,021

(22) PCT Filed: Jan. 30, 2014

(86) PCT No.: PCT/FR2014/050171
§ 371 (c)(1),
(2) Date: Jul. 2, 2015

(87) PCT Pub. No.: WO2014/118470
PCT Pub. Date: Aug. 7, 2014

(65) Prior Publication Data
US 2015/0360678 A1  Dec. 17, 2015

(30) Foreign Application Priority Data
Jan. 31, 2013 (FR) ..................... 13 50810

(51) Int. Cl.
*B60L 9/00* (2006.01)
*B60L 11/00* (2006.01)
(Continued)

(52) U.S. Cl.
CPC ........ *B60W 20/1088* (2013.01); *B60W 10/06* (2013.01); *B60W 10/08* (2013.01);
(Continued)

(58) Field of Classification Search
USPC .......................................... 701/22
See application file for complete search history.

(56) References Cited

U.S. PATENT DOCUMENTS

| 8,412,396 B2* | 4/2013 | Swales ................ B60K 6/485 477/5 |
| 8,776,922 B2* | 7/2014 | Fassnacht ............ B60W 10/04 180/65.1 |

(Continued)

FOREIGN PATENT DOCUMENTS

| EP | 1 428 711 | 6/2004 | |
| EP | 1428711 A1 * | 6/2004 | ............. B60K 6/485 |

OTHER PUBLICATIONS

French Search Report dated Nov. 11, 2013 in French Patent Application No. 1350810 Filed Jan. 31, 2013.
(Continued)

*Primary Examiner* — Jean Paul Cass
(74) *Attorney, Agent, or Firm* — Oblon, McClelland, Maier & Neustadt, L.L.P.

(57) ABSTRACT

A method for reducing energy of torque for electrically boosting acceleration of a hybrid vehicle including a power train, a heat engine, an electric machine capable of jointly or separately outputting a torque to a wheel in accordance with management laws optimizing energy consumption of the vehicle, and a traction battery which is capable of recovering all or part of kinetic energy of a decelerating vehicle in a form of electric energy, and rechargeable via the heat engine. In the method electric boost torque available for the torque boost is reduced by a reduction coefficient of 0 to 1 according to an amount of energy remaining in an energy range of the battery reserved for the torque boost.

5 Claims, 3 Drawing Sheets

Figure 1:
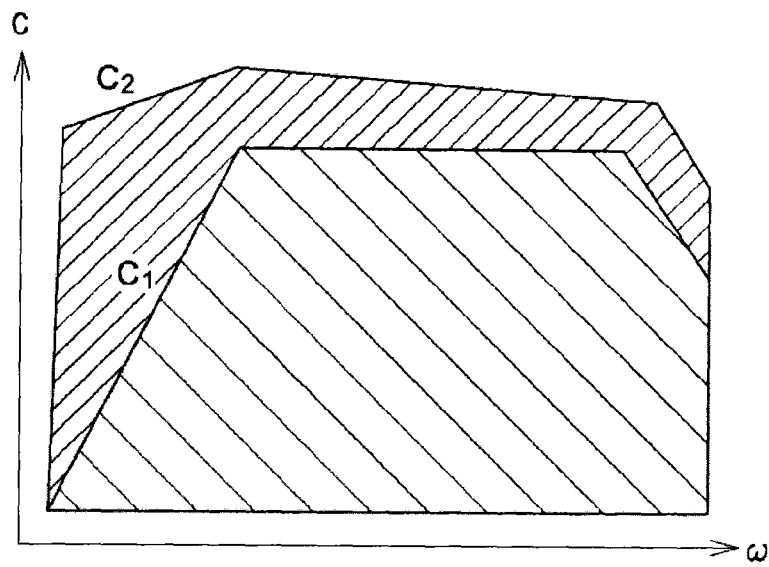

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60W 20/00* | (2016.01) | |
| *B60W 10/06* | (2006.01) | |
| *B60W 10/08* | (2006.01) | |
| *B60W 10/26* | (2006.01) | |
| *B60W 20/13* | (2016.01) | |
| *B60W 20/14* | (2016.01) | |
| *B60W 20/19* | (2016.01) | |

(52) U.S. Cl.
CPC ............ *B60W 10/26* (2013.01); *B60W 20/00* (2013.01); *B60W 20/13* (2016.01); *B60W 20/14* (2016.01); *B60W 20/19* (2016.01); *B60W 2510/244* (2013.01); *B60W 2710/083* (2013.01); *Y02T 10/6286* (2013.01); *Y02T 10/7258* (2013.01)

(56) References Cited

U.S. PATENT DOCUMENTS

| | | | | |
|---|---|---|---|---|
| 2002/0139593 A1* | 10/2002 | Charaudeau | ............ | B60K 6/28 180/65.245 |
| 2003/0183431 A1* | 10/2003 | Cikanek | .................. | B60K 6/48 180/65.6 |
| 2004/0178756 A1* | 9/2004 | Zhenxing | ................ | B60K 6/48 318/432 |
| 2004/0231897 A1* | 11/2004 | Kimura | ................ | B60K 6/365 180/65.235 |
| 2004/0232861 A1 | 11/2004 | Wakashiro et al. | | |
| 2006/0174624 A1* | 8/2006 | Grabowski | ............. | B60K 6/40 60/709 |
| 2007/0125083 A1* | 6/2007 | Rollinger | ................ | B60K 6/48 60/605.1 |
| 2007/0187158 A1* | 8/2007 | Muta | ..................... | B60K 6/445 180/65.1 |
| 2007/0215110 A1* | 9/2007 | Stein | ................... | F02D 19/0628 123/431 |
| 2007/0247001 A1* | 10/2007 | Nakano | .................... | B60T 1/10 303/157 |
| 2010/0026218 A1* | 2/2010 | Ogino | ................... | B60K 6/365 318/400.3 |
| 2010/0056327 A1* | 3/2010 | Hofbauer | ................ | B60K 5/08 477/5 |
| 2010/0117568 A1* | 5/2010 | Iwashita | ................ | H02P 21/14 318/400.02 |
| 2010/0168969 A1* | 7/2010 | Inagaki | .................. | B60K 6/365 701/55 |
| 2010/0198436 A1* | 8/2010 | Falkenstein | ............ | B60K 6/387 701/22 |
| 2011/0139117 A1* | 6/2011 | Kar | ....................... | F02D 11/105 123/395 |
| 2012/0197506 A1* | 8/2012 | Reynolds | ................ | B60T 8/175 701/84 |
| 2013/0127166 A1* | 5/2013 | Izadian | ................... | F03D 9/002 290/44 |
| 2013/0190958 A1* | 7/2013 | Izumi | .................... | B60W 20/20 701/22 |
| 2013/0271086 A1* | 10/2013 | Mitsutani | ................. | H02H 7/18 320/134 |
| 2015/0258950 A1* | 9/2015 | Namuduri | ............... | B60L 15/20 701/22 |
| 2015/0360678 A1* | 12/2015 | Le Roy | ............ | B60W 20/1088 701/22 |

OTHER PUBLICATIONS

International Search Report dated May 13, 2014 in PCT/FR2014/050171 Filed Jan. 30, 2014.

* cited by examiner

METHOD FOR REDUCING THE ENERGY OF THE ACCELERATION-BOOSTING TORQUE OF A HYBRID VEHICLE

The present invention relates to the technical field of hybrid vehicles, and more particularly that of their energy management.

Its subject is a method for limiting the torque for boosting the acceleration of a hybrid vehicle equipped with a power train comprising at least one heat engine and one traction machine, capable of jointly or separately supplying a torque to the wheel, under the control of management laws optimizing the energy consumption of the vehicle, and a traction battery capable of recovering at least a part of the kinetic energy of the vehicle in deceleration in the form of electrical energy, and that can be recharged via the heat engine.

When the energy of the battery of a hybrid vehicle is made available to all the services of the vehicle, without priority management, or usage limiting, the use of the vehicle is limited by the storage capacity of the batteries. Such is notably the case for vehicles that cannot be charged on the electrical network, called "mild-hybrid" vehicles, of which the onboard energy capacity still remains fairly low currently.

Without energy limiting on its response, the power train control system always implements the torque request from the driver, at the risk of completely draining the traction battery. When the battery recharging possibilities are limited to the partial recovery of kinetic energy in deceleration, they are limited and slow, even if the battery can also be recharged by the heat engine. Thus, a relatively "active" user will rapidly drain the battery, without reducing its consumption, his or her "sporty" driving cancelling out the consumption gains inherent in the hybrid vehicles. Now, reducing the energy consumption is a priority objective in hybrid vehicles.

One service that is particularly appreciated in hybrid vehicles is the possibility of supplying more torque to the wheel, with the assistance of the electrical machine, than what the heat engine can supply alone. This is called "overtorque" or electrical torque boost. When the driver puts the foot down, the heat engine is boosted by the electrical machine operating in "engine" mode to maximize the torque supplied to the wheel. This service, illustrated by FIG. 1, consumes a lot of electrical energy. Therefore it risks rapidly draining the traction battery. Then, the energy management law (LGE) can no longer be applied fully, so that the overall consumption of the power train increases. This situation occurs all the more frequently when the capacity of the battery is low. Through the publication FR 2 902 705, a micro-hybrid system for motor vehicles is known, in which the piloting system comprises means capable of defining and allowing different modes of operation, including a "regenerative" braking mode of the rotating electrical machine and a torque boost mode of the rotating electrical machine.

However, there is no provision to limit the boost torque on acceleration made available to the driver, to optimize the use of the traction battery.

The present invention aims to control the overall consumption of the power train, including the energy expenditure linked to the torque boost, as a function of its energy capacity, so as not to penalize the consumption gain associated with the hybrid vehicle.

To this end, it proposes that the electrical boost torque available for the torque boost be reduced by a limiting coefficient of between 0 and 1, depending on the quantity of energy remaining within an energy band of the battery, which is reserved for the torque boost.

One of the objects of the present invention is thus to control the torque boost made available to the driver, to limit the impact of this service on the energy optimization of the vehicle.

These provisions make it possible to introduce into the energy management of the vehicle priority rules between observing the demand for torque to the wheel from the driver, and reducing the consumption of the power train.

The monitoring mechanism introduced into the control dynamically manages the quantity of energy that is to be allocated to improve the acceleration. It thus continues to optimize the consumption, even if the driver regularly calls on the performance characteristics of the power train.

Figure 2:
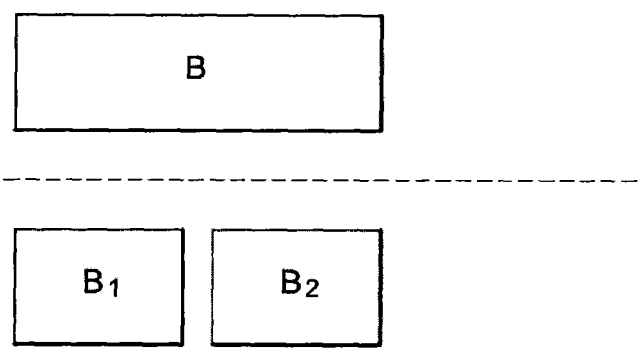
Figure 3:
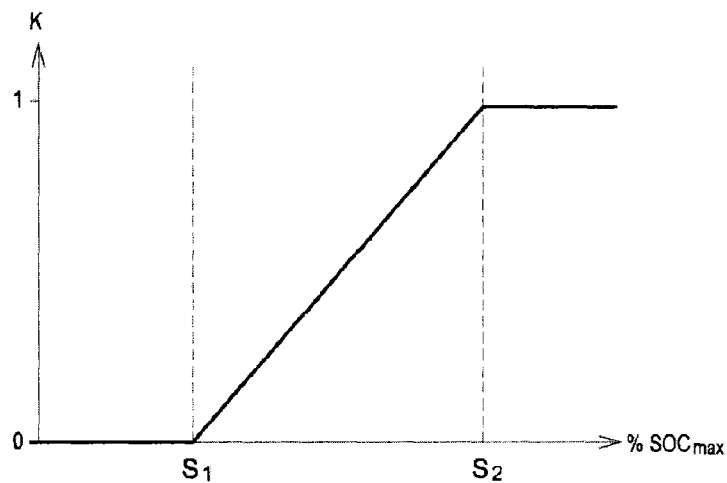
Figure 4:
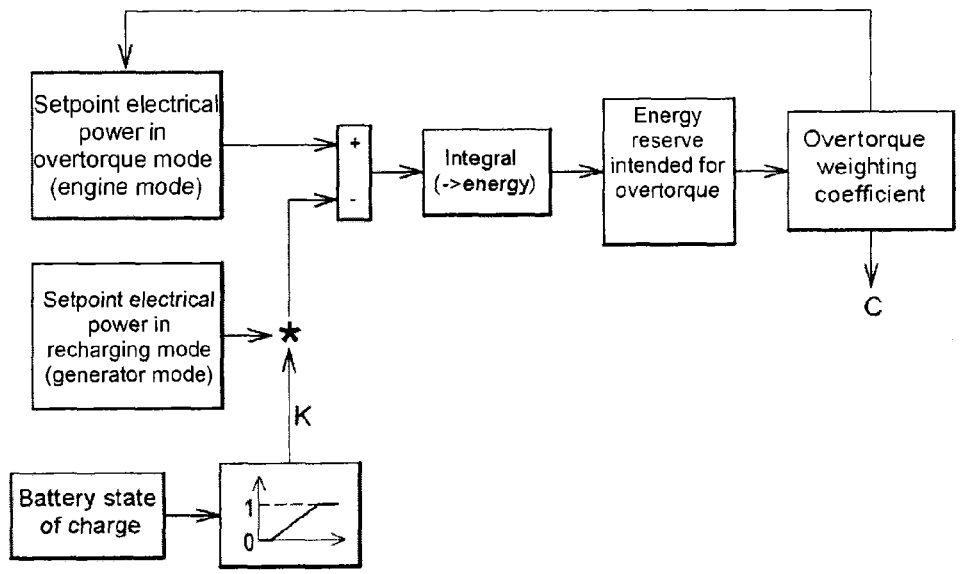
Figure 5:
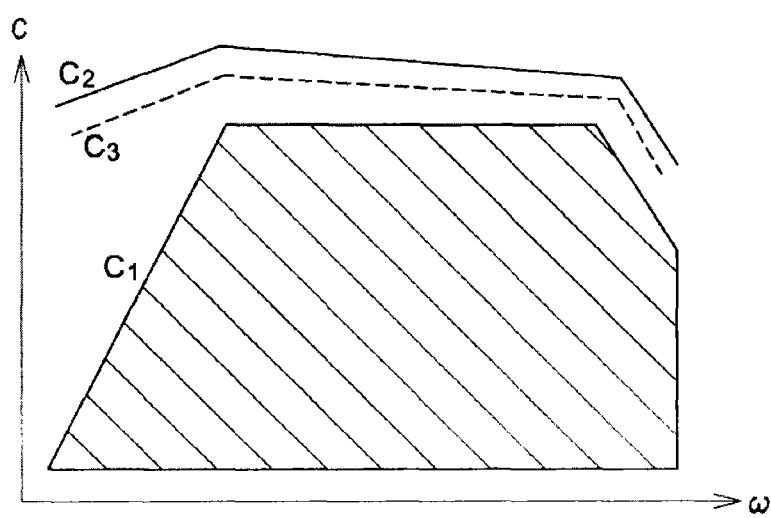

Other features and advantages of the present invention will become clearly apparent on reading the following description of a non limiting embodiment thereof, by referring to the attached drawings, in which:

FIG. 1 shows the extra torque from the electrical torque boost over the maximum torque from the heat engine, FIG. 2 illustrates the proposed energy management mode, FIG. 3 illustrates the calculation of distribution of the recovered energy on which this management mode is based, FIG. 4 is a scheme for computing the integral limiting the electrical torque boost, and FIG. 5 illustrates the reduction of the torque obtained compared to FIG. 1.

In a hybrid vehicle equipped with a power train comprising at least one heat engine and one electrical machine, capable of jointly or separately supplying a torque to the wheel, these two sources of energy are placed under the control of management laws (LGE) optimizing the energy consumption of the vehicle. A traction battery, generally capable of recovering, in electrical energy form, at least a part of the kinetic energy of the vehicle in deceleration, and that can be recharged via the heat engine, powers the electrical machine.

A hybrid vehicle therefore has at least two actuators capable of supplying torque to the wheel: the torque demand from the driver can thus be satisfied by the sum of the torques supplied by the electrical machine and the heat engine. As indicated above, it is possible to improve the overall consumption of a hybrid power train by optimizing the distribution of torque between the two actuators, by virtue of an appropriate energy management law (LGE). However, for this law to be able to fully play its part, the traction battery must permanently have a reserve of energy sufficient to apply the optimal distribution.

The maximum torque of the power train is defined on the basis of the maximum torque supplied by the heat engine, to which is added the overtorque supplied by the electrical machine. The curves $C_1$, $C_2$ of FIG. 1 respectively show the trend of the maximum torque of the heat engine as a function of its speed $\omega$, and the maximum torque envelope available to the wheel with the addition of the electrical torque boost. The difference between the two curves $C_1$ and $C_2$ represents the available electrical torque boost. In order to control the energy expenditure of the driver in strong acceleration phases, it is proposed to limit the electrical boost torque available, by applying to it a limiting coefficient C, lying between 0 and 1. The electrical boost torque available for the torque boost is thus reduced by the limiting coefficient C, according to the quantity remaining within an energy band of the battery, which is reserved for the torque boost. The limiting coefficient C is calculated as a function of the energy remaining, within an energy band reserved for the torque boost. In the proposed method, it is in fact considered that the energy stored in the traction battery B is distributed between two energy bands (B$_1$, B$_2$), reserved respectively for the application of the energy management law of the power train outwith the electrical torque boost, and with the electrical torque boost.

The distinction between the two energy bands is illustrated by FIG. 2: its top part corresponds to a physical representation of the traction battery B of the vehicle, whereas its bottom part introduces the proposed monitoring mode with the distinction of two hypothetical batteries: a first battery B$_1$, the energy of which is involved without reserve in the energy management law in order to reduce the overall consumption of the power train, and a second battery B$_2$, reserved for the torque boost.

To calculate the quantity of energy available in the band B$_2$, the power already supplied by the electrical machine in torque boost mode is integrated. The value of this integral, named I, is calculated as follows:

$$I = \int_T P_{ElecOUT} - (P_{ElecRECUP} * K),$$

in which:

$P_{ElecOUT} = \max((P_{GMP} - P_{MAXthermique}) * n_{Elec}; 0)$ is the electrical power dissipated in torque boost mode, $D_{Elec}$ is an overall electrical efficiency, comprising the efficiency of the electrical machine, of the inverter, and of the battery, $P_{GMP}$ is the power demanded of the power train by the driver, $P_{MAXthermique}$ is the maximum power than the heat engine can supply, $$P_{ElecRECUP} = \min\left(\frac{P_{GMP}}{nElec}; 0\right)$$

is the electrical power recovered,

K is a weighting coefficient calculated as a function of the state of charge of the physical battery, and T is the time spent in mission.

The coefficient K makes it possible to assign the energy recovered by the electrical machine in "generator" mode, either in the battery B$_1$, or in the battery B$_2$.

When the reserve of energy for the torque boost is full, I=0 [Wh]. When the reserve of energy is empty, I=E$_{MAX}$ [Wh], E$_{MAX}$ being the quantity of an energy made available to the driver, that is to say the capacity of the hypothetical battery B$_2$.

If the battery B$_1$ contains enough energy to allow for the energy optimization, then K=1. All the energy recovered is then assigned to the battery B$_2$. The driver can expend the recovered energy, in electrical torque boost mode.

If the battery B$_1$ does not contain enough energy to allow for the energy optimization then K=0. All the recovered energy is assigned to the battery B$_1$: it is recharged with the energy recovered, without allocating energy to the hypothetical battery B$_2$: the driver no longer benefits from the electrical boost in strong acceleration phases. Priority is thus given to reducing the consumption, rather than to the performance of the power train. The driver no longer has all the performance characteristics of the electrical boost since he or she has already expended all the energy allocated thereto.

The weighting coefficient K defines the order of priority of the energy storage between the battery B$_1$ and the battery B$_2$, in order to improve either the performance, or the consumption. The scheme of FIG. 3 illustrates a non limiting way of determining K, as a function of the percentage charge of the battery, SOC %. Below a first threshold S$_1$, K is 0. All the energy recovered in the battery is devoted to the energy management law LGE. Between S$_1$ and a second threshold S$_2$ higher than the latter, K has a linear growth. From S$_2$, K=1, all the energy recovered in the battery is available for the torque boost.

According to FIG. 4, the difference between the first and the second quantity of energy, weighted by the coefficient K that is a function of the state of charge of the battery SOC, is integrated. The quantity of energy I assigned to the energy band B$_2$ is calculated by integrating the electrical power supplied by the electrical machine in torque boost mode. This power is calculated by the difference between the electrical power effectively consumed in torque boost mode and the electrical power recovered in deceleration or by recharging via the heat engine. The electrical power recovered is thus weighted by the weighting coefficient K, calculated as a function of the state of charge of the traction battery.

The value of the integral I, corresponding to the reserve of energy reserved for the electrical boost, makes it possible to obtain, by mapping, the limiting coefficient C, limiting the electrical boost, which is returned in a loop on the available electrical power setpoint in torque boost mode.

FIG. 5 introduces the limiting of the power available for the boost in FIG. 1. In this example, the envelope of maximum torque available to the wheel with the addition of the electrical torque boost without weighting (curve C$_2$) and the electrical torque boost available with a limiting of the order of 20% (curve C$_3$) are distinguished.

As indicated above, when the integral I reaches E$_{MAX}$, the electrical torque in torque boost mode becomes zero. The following example illustrates the implementation of the method on the basis of a number of examples.

In a first situation, with an integral I (hypothetical battery B$_2$) of 30 Wh, and a 30 Wh recharged physical battery B, its state of charge (SOC) is considered to be high, K=1. The energy management law (LGE) has enough energy to optimize the consumption. The 30 Wh recovered can be assigned to the hypothetical battery B$_2$, to be expended fully in boost mode.

In a second situation, with a same integral I value of 30 Wh of B$_2$, there is a low physical battery state of charge, placing, for example, the coefficient K at 0.33. The LGE does not have enough energy to optimize the consumption. 20 Wh of the 30 Wh of the hypothetical battery are allocated to the LGE (battery B$_1$) by discharging the hypothetical battery by only 10 Wh for the boost (battery B$_2$).

In a third situation, still with the same integral value of 30 Wh, the state of charge of the physical battery places the coefficient K at the value 0. The LGE does not have enough energy to optimize the consumption. All of the 30 Wh recovered will therefore be allocated to it (battery B$_1$), without assigning energy to the battery B$_2$ for the boost.

The invention offers many advantages:
  it makes it possible to limit the electrical boost torque made available to the driver for strong accelerations, so as not to affect the energy management, particularly on hybrid vehicles with little on board energy, and
  it facilitates the typing of the electrical machine between targets of performance or of consumption.

The invention claimed is:

1. A method for limiting energy of torque for electrically boosting acceleration of a hybrid vehicle including a power train, at least one heat engine, and at least one electric machine configured to jointly or separately supply torque to a wheel under control of management laws optimizing energy consumption of the hybrid vehicle, and a traction battery configured to recover at least a part of kinetic energy of the hybrid vehicle in deceleration in a form of electrical energy, and be recharged via the at least one heat engine, the method comprising:

defining the traction battery according to a first hypothetical battery and a second hypothetical battery, the first hypothetical battery defining a first energy band not reserved for electrical torque boost, and the second hypothetical battery defining a second energy band reserved for electrical torque boost; and reducing electrical boosting torque available for torque boost by a limiting coefficient having a value between 0 and 1, according to a quantity of energy remaining within the second energy band of the traction battery reserved for electrical torque boost, wherein energy stored in the traction battery is distributed based on the first and second energy bands, reserved respectively for application of an energy management law of the power train without reservation of the electrical torque boost, and with reservation of the electrical torque boost, wherein a quantity of energy assigned to the second energy band reserved for electrical torque boost is computed by integrating electrical power supplied by the at least one electric machine in a torque boost mode, wherein the electrical power supplied by the at least one electric machine in the torque boost mode is computed based on a difference between electrical power effectively consumed in the torque boost mode and electrical power recovered in deceleration or by recharging via the at least one heat engine, wherein the electrical power recovered in deceleration or by recharging via the at least one heat engine is weighted by a weighting coefficient computed as a function of a state of charge of the traction battery, and wherein the limiting coefficient is obtained by mapping, from the value of the integral obtained by the integrating of the electrical power supplied by the at least one electric machine in the torque boost mode.

2. The energy limiting method as claimed in claim 1, wherein the limiting coefficient is computed as a function of the quantity of energy remaining within the second energy band of the traction battery reserved for the electrical torque boost.

3. The energy limiting method as claimed in claim 1, wherein the weighting coefficient is 0 below a first threshold of a percentage of charge of the traction battery.

4. The energy limiting method as claimed in claim 3, wherein the weighting coefficient increases from the value 0 to the value 1, between the first threshold and a second threshold greater than the first threshold.

5. The energy limiting method as claimed in claim 1, wherein the limiting coefficient is returned in a loop as an electrical boost torque setpoint.

* * * * *